United States Patent
McMillan (10) Patent No.: US 9,193,097 B2
(45) Date of Patent: Nov. 24, 2015

(54) COMPOSITE MATERIAL HOLLOW AXISYMMETRIC BODY

(75) Inventor: Alison J. McMillan, Uttoxeter (GB)

(73) Assignee: ROLLS-ROYCE plc, London (GB)

( * ) Notice: Subject to any disclaimer, the term of this patent is extended or adjusted under 35 U.S.C. 154(b) by 346 days.

(21) Appl. No.: 13/276,819

(22) Filed: Oct. 19, 2011

(65) Prior Publication Data

US 2012/0114884 A1    May 10, 2012

(30) Foreign Application Priority Data

Nov. 4, 2010  (GB) .................................. 1018603.9

(51) Int. Cl.
| | |
|---|---|
| B29C 35/02 | (2006.01) |
| B29C 61/06 | (2006.01) |
| B29C 65/00 | (2006.01) |
| B32B 1/00 | (2006.01) |
| B64D 33/02 | (2006.01) |
| B64C 7/02 | (2006.01) |
| B29C 70/46 | (2006.01) |
| B29C 35/08 | (2006.01) |
| B29C 71/02 | (2006.01) |

(52) U.S. Cl.
CPC ............ B29C 35/02 (2013.01); B29C 61/0658 (2013.01); B29C 66/41 (2013.01); B29C 35/0266 (2013.01); B29C 70/462 (2013.01); B29C 2035/0855 (2013.01); B29C 2071/022 (2013.01); B64C 7/02 (2013.01); B64D 33/02 (2013.01); F05C 2253/04 (2013.01); Y10T 428/13 (2015.01)

(58) Field of Classification Search
USPC ........................ 264/545, 258, 263, 327, 334
See application file for complete search history.

(56) References Cited

U.S. PATENT DOCUMENTS

| | | | | |
|---|---|---|---|---|
| 5,407,610 | A * | 4/1995 | Kohama et al. ............... | 264/496 |
| 6,129,311 | A * | 10/2000 | Welch et al. .............. | 244/117 R |
| 6,179,943 | B1 * | 1/2001 | Welch et al. .................. | 156/160 |
| 6,453,635 | B1 * | 9/2002 | Turner ............................ | 52/848 |
| 8,128,775 | B2 * | 3/2012 | Maheshwari et al. ........ | 156/252 |

(Continued)

FOREIGN PATENT DOCUMENTS

FR    2 624 787 A1    6/1989

OTHER PUBLICATIONS

Svanberg et al. (An experimental investigation on mechanisms for manufacturing induced shape distortions in homogenous and balanced laminates. Composites: Part A 32 (2001) 827-838).*

(Continued)

*Primary Examiner* — Atul P. Khare
(74) *Attorney, Agent, or Firm* — Oliff PLC (57) ABSTRACT

A method of manufacturing a component comprising a hollow axisymmetric body formed of a cured composite material is provided. The method includes the step of positioning the constituents of the composite material in a mold corresponding to at least a portion of the hollow axisymmetric body. The composite material is cured into a composite part, and residual stresses are generated in the composite material during the curing by controlling the temperature of the constituents in the mold. When the composite part is released from the mold, relaxation of the residual stresses causes one or more regions of the composite part to deflect in the radial direction of the hollow axisymmetric body, the position of greatest radial deflection of each region having a radial deflection which is at least 0.1% of the greatest diameter of the hollow axisymmetric body.

19 Claims, 5 Drawing Sheets

(56) References Cited

U.S. PATENT DOCUMENTS

| | | | |
|---|---|---|---|
| 2009/0022579 A1* | 1/2009 | Schlichting et al. | 415/144 |
| 2009/0309264 A1 | 12/2009 | Cavaliere | |
| 2010/0077721 A1* | 4/2010 | Marshall | 60/39.091 |
| 2010/0164147 A1* | 7/2010 | Rodman | 264/503 |
| 2012/0286457 A1* | 11/2012 | Everhart et al. | 264/531 |

OTHER PUBLICATIONS

Wiersma et al. (Prediction of springforward in continuous-fiber/polymer L-shaped parts. Composites Part A 29A (1998) 1333-1342).*

Fernlund et al. (Experimental and numerical study of the effect of cure cycle, tool surface, geometry, and lay-up on the dimensional fidelity of autoclave-processed composite parts. Composites: Part A 33 (2002) 341-351).*

Albert et al. (Spring-in and warpage of angled composite laminates. Composites Science and Technology 62 (2002) 1895-1912).*

Niu (Process Induced Residual Stresses and Dimensional Distortions in Advanced Laminated Composites. University of Florida Dissertation, 1999).*

Kim et al. (Reduction of residual stresses in thick-walled composite cylinders by smart cure cycle with cooling and reheating. Composite Structures 75 (2006) 261-266).*

Fernlund et al., "Process Analysis and Tool Compensation for a Complex Composite Panel," Presented at American Society for Composites $22^{nd}$ Annual Technical Conference, Seattle, WA, Sep. 17-20, 2007, pp. 1-12.

Johnston et al., "A Sensitivity Analysis of Factors Affecting the Warpage of a Composite Structure," Dec. 31, 1998, 12 pgs.

Jan. 25, 2012 European Search Report issued in Appln. No. EP 11 18 898.

Feb. 28, 2011 IPO Search Report issued in Patent Application No. GB1018603.9.

Feb. 1, 2012 extended European Search Report issued in European Patent Application No. 11 185 898.1.

Apr. 10, 2013 Patent Office Communication issued in European Patent Application No. 11 185 898.1.

Nov. 5, 2013 Patent Office Communication issued in European Patent Application No. 11 185 898.1.

* cited by examiner

COMPOSITE MATERIAL HOLLOW AXISYMMETRIC BODY

FIELD OF THE INVENTION

The present invention relates to a component comprising a hollow axisymmetric body formed of a cured composite material, and a method of manufacturing a component comprising a hollow axisymmetric body formed of a cured composite material.

BACKGROUND OF THE INVENTION

Figure 1:
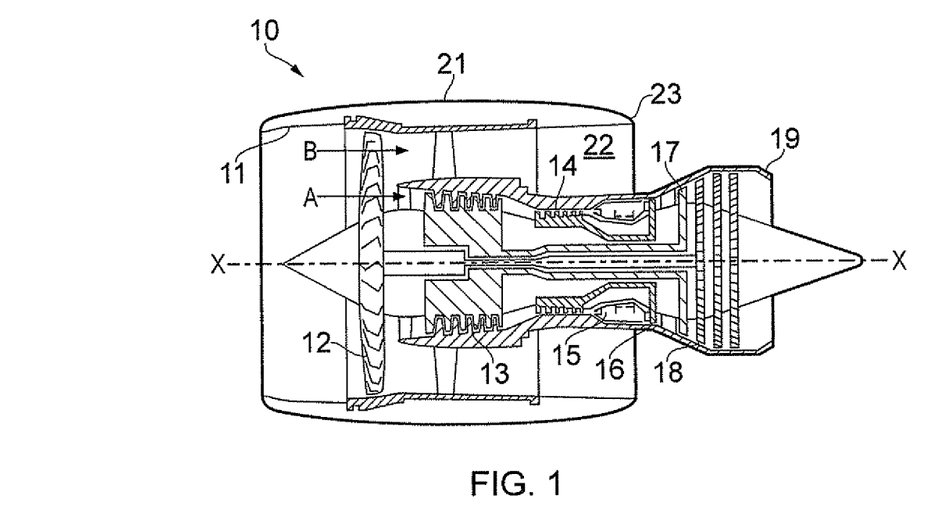
FIG. 1 shows schematically a longitudinal section through a ducted fan gas turbine engine.

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 14 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Gas turbine engines comprise a multitude of hollow axisymmetric components. Many of these components are annular. Some annular components may be connected to coaxial components by circumferentially spaced spokes extending between the components. Examples of annular components without spokes include front and rear fan casings, ducts and the nacelle 21. Examples of annular components with spokes include front frames of gas turbine engines used in military aircraft, front bearing housings, intermediate casings and tail bearing housings.

Many of the annular components either enclose a set of rotor blades, or are connected to another annular component that encloses a set of rotor blades. Thus, it is important for an annular component to maintain roundness and to have high stiffness. If the annular component deforms, for example to an oval cross section, the blade tip clearance can be too low in some regions and too high in other regions. Too low a blade tip clearance can result in excessive wear of the annular component, and too high a blade tip clearance can increase leakage over the blade tips and reduce engine efficiency.

Another hollow axisymmetric component of a gas turbine engine is the conical nose cone. This has to be strong and stiff to resist external impacts, such as bird strikes.

A given hollow axisymmetric component may be manufactured as a single piece, for example a single piece casting, or may be fabricated from multiple components joined together, for example by welding. An example of a fabricated annular component is the nacelle.

At present, many hollow axisymmetric components are made from metal. However, some components, including fan casings, containment casings, nacelles and nose cones can be manufactured from composites. Composites components can be lighter weight than the metal equivalents. Additionally, the strength and stiffness characteristics of an composite component can be optimised by e.g. controlling the orientation of the reinforcing fibres in the composite.

To manufacture a composite component, the fibres, resin and other constituents of the composite material are typically combined and compacted into a mould and then cured. The curing is an exothermic chemical process that takes place at elevated temperature and pressure. The temperature of the composite constituents during curing affects the amount of shrinkage and thence the distribution of residual stresses in the annular component. These residual stresses can relax to cause a final product to distort from the mould shape. Annular components with spokes are particularly prone to residual stress-induced distortion. Generally, the moulding and curing processes are controlled to reduce or eliminate distortion of the component. Where distortion cannot be eliminated, components may be manufactured oversize, and then finished to the required dimensions, for example by machining. The need for a substantial finishing process increases both the time and the cost of manufacture.

SUMMARY OF THE INVENTION

The present invention is at least partly based on a realisation that residual stress-induced distortion of a cured composite material can be harnessed to improve the stiffness of a component having a hollow axisymmetric body.

Therefore, in a first aspect, the present invention provides a method of manufacturing a component comprising a hollow axisymmetric body formed of a cured composite material, the method including the steps of:

positioning the constituents of the composite material in a mould corresponding to at least a portion of the hollow axisymmetric body;

curing the composite material into a composite part, residual stresses being generated in the composite material during the curing by controlling the temperature of the constituents in the mould; and releasing the composite part from the mould, whereupon relaxation of the residual stresses causes one or more regions of the composite part to deflect in the radial direction of the hollow axisymmetric body, the position of greatest radial deflection of each region having a radial deflection which is at least 0.1% of the greatest diameter of the hollow axisymmetric body. Thus, for example, where the hollow axisymmetric body is substantially cylindrical, the diameter of the body does not change substantially with axial position, and the greatest diameter of the body is therefore the diameter at any axial position. In contrast, where the hollow axisymmetric body is conical or frustoconical, the greatest diameter of the body is the diameter at the base of the cone or frustocone.

Advantageously, under certain types of loading, a deflected composite part may deform less per unit applied load than an un-deflected composite part, i.e. stiffness is increased. More particularly, loading a deflected part in a direction that increases the deflection amplitude can give rise to a non-linear elastic response, while loading in other directions can give stiffened, but still linear, elastic responses. Additionally, the deflection relaxes the residual stresses in the composite part. Decreased internal stresses can improve the ultimate tensile, ultimate compressive and fatigue strength of the composite part, and can also reduce a risk of further undesired deflection during use of the component part.

Having relaxed residual stresses, the deflected composite part can respond elastically to larger deformations than a corresponding un-deflected composite part. Increased elastic deformation permits can improve energy absorption and distribution of impact forces across the composite part, thus reducing peak impact forces and stresses. More particularly, as impact energy tends to be absorbed by the composite part through inelastic processes, such as local material failures (i.e. brittle failure modes in the case of fibre reinforced composites), de-lamination and plastic deformation, an advantageous increase in the spatial distribution of inelastic processes through the volume of the component can result from the increased elastic deformation. In some cases, the elastic deformation may be such that when a specific impact force is applied, a deflected region "snaps-through", i.e. an outwardly radially projecting deflected region can become an inwardly radially projecting region.

The method may have any one or, to the extent that they are compatible, any combination of the following optional features.

The mould may correspond to the hollow axisymmetric body, such that the composite part released from the mould is the hollow axisymmetric body. Alternatively, the mould may correspond to a portion of the hollow axisymmetric body; the positioning, curing and releasing steps can be repeated for other portions of the hollow axisymmetric body; and the method can include a subsequent step of joining the respective composite parts together to form the hollow axisymmetric body.

The position of greatest radial deflection of each region may have a radial deflection which is at least 0.25% and preferably at least 0.5% of the diameter of the hollow axisymmetric body at that region, and/or at most 10% and preferably at most 4 or 2% of the diameter of the hollow axisymmetric body at that region. Typically, the radial deflection of each deflected region causes the corresponding transverse cross-section through the hollow axisymmetric body to locally depart from true circularity by the amount of the radial deflection.

The hollow axisymmetric body may have a plurality of deflected regions that are circumferentially spaced around the body. An effect, on a transverse cross-section through the circumferentially spaced deflected regions, can therefore be to produce a degree of polygonisation on an otherwise circular cross-section. Preferably, the deflected regions are equally circumferentially spaced around the body. This helps to retain the general roundness of the body and avoid ovalisation.

Preferably, the deflection of each region is a buckling deflection. Buckling is a particular form of distortion associated with elastic instability of the composite part caused by compressive residual stresses in the deflected region. That is, when the region part buckles, the load response of the region transforms from linear-elastic to non-linear elastic.

Thermal gradients can be applied across the composite material to generate the residual stresses. Thermal gradients can be applied using, for example, insulating layers, heat sinks, heat sources, and heat control mechanisms on the mould.

An electrical heater may be positioned within the mould, and during the curing step the heater may be used to locally increase the temperature of the composite material to generate the residual stresses.

During the curing step focused microwave heating can be used to locally increase the temperature of the composite material to generate the residual stresses. In this case, the microwaves may be tuned to the constituents of the composite, for example, resin and/or fibres. It may also be advantageous to add an additive to the composite constituents to which the microwaves can be tuned for further control of the focussed microwave heating.

Additionally, during the cooling step, local cooling of the composite material can be used to control the generation of residual stresses.

Preferably, one or more bracing elements are positioned in the mould before the curing step, the bracing elements being integrated into the composite part during the curing step and constraining the composite material to promote the generation of the residual stresses. The bracing elements may include one or more circumferentially extending ribs. For example, a bracing element can be a stiffening rib or connecting flange. Alternatively, or additionally, the bracing elements can include one or more radially extending spokes.

Preferably, the mould is shaped to provide one or more thickened regions of composite material, the thickened regions constraining the composite material in adjacent thin regions, thereby promoting the generation of the residual stresses in the thin regions. The thickened regions can be advantageously orientated to optimise the local direction of maximum stiffness of the component.

The hollow axisymmetric body can be, e.g. cylindrical, annular, conical, frustoconical etc. The component may be a component of a gas turbine engine. For example, an engine component having an annular body can be a front frame, a front bearing housing, an intermediate casing, a tail bearing housing, a front or rear fan casing, a duct, an outer guide vane ring or a nacelle. An engine component having a hollow conical body can be a nose cone.

In a second aspect, the present invention provides a component comprising a hollow axisymmetric body formed of a cured composite material, the hollow axisymmetric body having one or more deflected regions where the hollow axisymmetric body is radially deflected to relax residual stresses generated during the curing of the composite material, the position of greatest radial deflection of each region having a radial deflection which is at least 0.1% of the greatest diameter of the hollow axisymmetric body.

The component may have any one or, to the extent that they are compatible, any combination of the following optional features. Further, the component can be manufactured by the method of the previous aspect, and thus the component may have one or more optional feature corresponding to optional features of the method.

The position of maximum radial deflection of each region may have a radial deflection which is at least 0.25% and preferably at least 0.5% of the diameter of the hollow axisymmetric body at that region, and/or at most 10% and preferably at most 4 or 2% of the diameter of the hollow axisymmetric body at that region.

Preferably, the radial deflection of each deflected region causes the corresponding transverse cross-section through the hollow axisymmetric body to locally depart from true circularity by the amount of the radial deflection.

The hollow axisymmetric body may have a plurality of deflected regions that are circumferentially spaced, and preferably circumferentially equally spaced, around the body.

Preferably, the deflection of each region is a buckling deflection.

Typically, the hollow axisymmetric body has one or more bracing elements which are integrated into the hollow axisymmetric body during the curing to constrain the composite material and promote the generation of the residual stresses. The bracing elements can include one or more circumferentially extending ribs (such as stiffening ribs or connecting flanges). Alternatively, or additionally, the bracing elements can include one or more radially extending spokes.

The hollow axisymmetric body may have one or more thickened regions of composite material, the thickened regions constraining the composite material in adjacent thin regions to promote the generation of the residual stresses in the thin regions.

The component may further comprise an electrical heater positioned within the composite material of the hollow axisymmetric body. The heater can be used to locally increase the temperature of the composite material during curing to generate the residual stresses.

In a third aspect, the present invention provides a gas turbine engine having a component (such as a front frame, a front bearing housing, an intermediate casing, a tail bearing housing, a front or rear fan casing, a duct, an outer guide vane ring, a nacelle or a nose cone) according to the second aspect.

BRIEF DESCRIPTION OF THE DRAWINGS

Embodiments of the invention will now be described by way of example with reference to the accompanying drawings in which:

FIG. 5b shows schematically an axial section along B-B of the region of FIG. 5a;

FIG. 5c shows schematically a transverse section along A-A of the region of FIG. 5a;

FIG. 6a shows schematically a further buckled region of an annular body of the component of FIG. 3;

FIG. 6b shows schematically an axial section along D-D of the region of FIG. 6a;

FIG. 6c shows schematically a transverse section along C-C of the region of FIG. 6a;

DETAILED DESCRIPTION

Figure 2A:
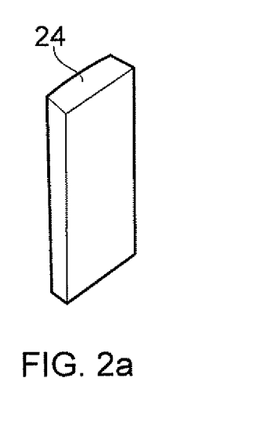
FIG. 2a shows schematically a rectangular composite tile with an as-in-mould shape.
Figure 2B:
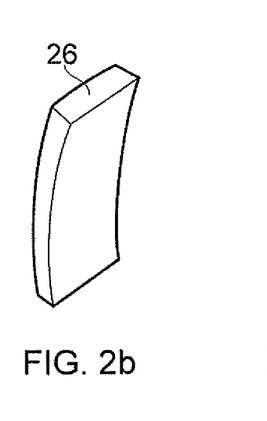
FIG. 2b shows schematically the tile of FIG. 2a deformed by the relaxation of residual stresses.
Figure 2C:
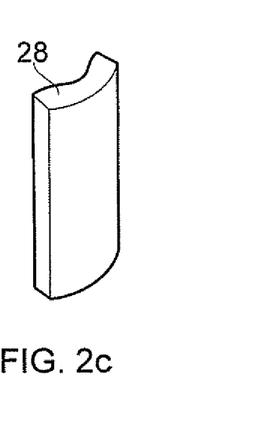
FIG. 2c shows schematically the tile of FIG. 2a deformed to a different shape by the relaxation of residual stresses.

Composites are typically manufactured by positioning the constituents of a composite material, for example fibres and resins, into a mould, and curing the composite material into a composite part. The resin of the composite material shrinks during curing, thereby generating residual stresses in the composite material. If the residual stresses are large enough, they can cause the cured composite part to deform as the stresses relax upon removal from the mould. For example, FIG. 2a shows a rectangular composite ply lay-up tile 24 having an as-in-mould shape, i.e. the shape of the composite tile is exactly that of the mould. However, after release from the mould, the tile may adopt one of the bent shapes 26, 28 shown in FIGS. 2b and 2c, due to the relaxation of residual stresses generated during curing. Upon applying a load to unbend the tile shown in FIG. 2b or 2c, the tile can "snap-through" to have the shape of the tile shown in the other of FIGS. 2b and 2c.

Assuming the composite is effectively immobilised in the mould, the residual stresses generated during curing, and hence the amount of deformation that can occur when a composite part is removed from a mould, typically depend upon the heating of the mould, the heat flow through the composite constituents during curing, the thermal properties of the fibre and the resin, the resin flow and any induced fibre placement shifting, volume changes due to changes in temperature, exothermic heat generated from the curing chemical reactions, volume change due to the chemical reactions of the curing process.

In conventional manufacture, the curing process is controlled to eliminate or reduce residual stress-induced deformation. The present invention, on the other hand, harnesses residual stresses to cause deflections, and particularly buckling deflections, of composite parts to create a component having increased stiffness. During buckling, the load bearing capability of a composite part is temporarily reduced as the component passes through the elastic instability, but thereafter the resulting buckled composite part can have improved load bearing capability, say relative to a desired engine duty load case, such that the deformation per unit applied load may be reduced, i.e. stiffness may be increased. The load bearing response of a deflected composite part may be changed to non-linear elastic, i.e. the deformation of the composite part may not be proportional to the applied load.

Figure 3:
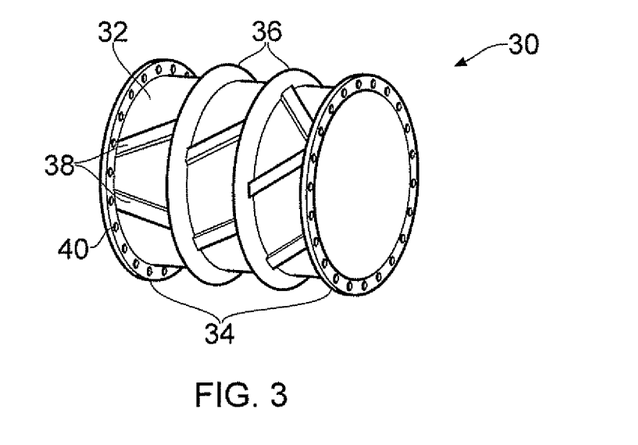
FIG. 3 shows schematically a perspective view of a component of the present invention.
Figure 4:
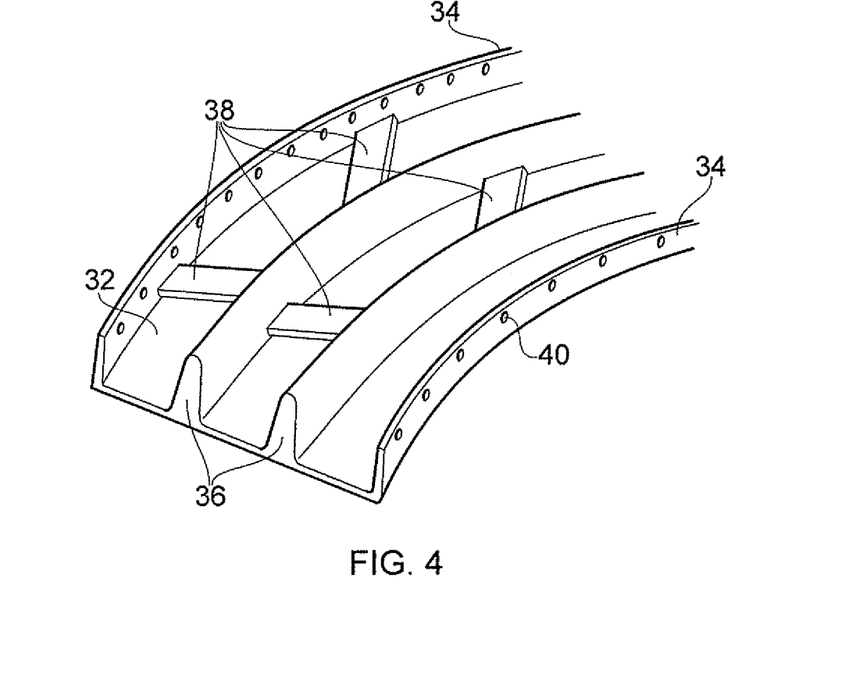
FIG. 4 shows schematically a close up view of a portion of the component of FIG. 3.

Referring to FIGS. 3 and 4, a component having an annular body 32 is indicated generally at 30. The component shown may be, for example, suitable for use as a fan casing. The component has an annular body formed from a buckled single composite part. In alternative embodiments, a plurality of buckled separate composite parts can be joined together to form the annular body. Connecting flanges 34 having a series of holes 40 and manufactured from metal are provided at each axial end of the annular body. The holes in each flange can be used to bolt or rivet the component to other parts of the gas turbine engine. Stiffening ribs 36 also made from metal encircle the annular body at axially spaced positions. In the present example there are two stiffening ribs, but the number of stiffening ribs can be chosen to meet the requirements of the intended application. The stiffening ribs are located on the outer surface of the annular body and extend radially outward from the annular body. However, in alternative embodiments, the stiffening ribs can be located on the inner surface of the annular body and extend radially inward. Both the stiffening ribs and connecting flanges can be integrated into the annular body during moulding and curing, e.g. by a hybrid connection in which the ribs and flanges are located in the mould with the pre-cured constituents of the composite material so that anchoring parts of the ribs and flanges become permanently embedded in the composite material after curing.

Thickened regions 38 of composite material are formed on the outer surface of the annular body 32 and extend between neighbouring connecting flanges 34 and stiffening ribs 36. The thickened regions are moulded and cured integrally with the annular body 32. However, in an alternative embodiment, the thickened regions can be pre-formed e.g. from a cured composite and positioned in the mould before the constituents of the composite material of the annular body are cured. The thickened regions of composite material are in a dual-direction helical arrangement (i.e. they are angled from the axial direction of the component). The thickened regions of the composite material can be, in an alternative embodiment, arranged in the axial direction of the component. As will be later apparent, the spacing and angle of the thickened regions is chosen to produce an annular body having buckled regions of maximum dimensional stability.

Figure 5A:
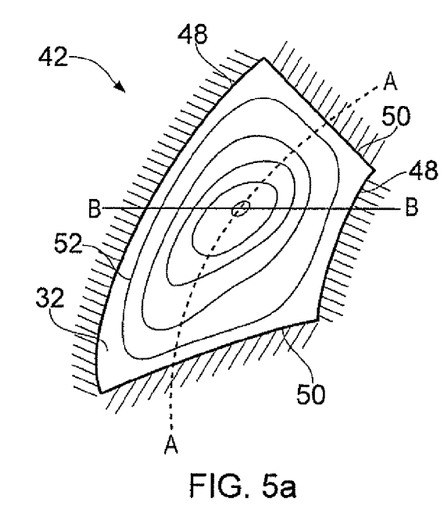
FIG. 5a shows schematically a buckled region of an annular body of the component of FIG. 3.
Figure 5B:
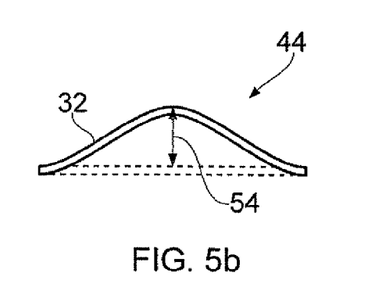
Figure 5C:
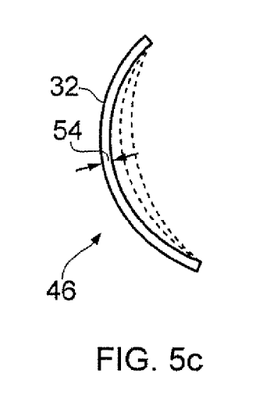

The buckled regions of the annular body 32 will now be discussed in more detail. FIGS. 5a to 5c show schematically a buckled region 42 of the annular body. FIG. 5b shows an axial section of the region of FIG. 5a along the line B-B, and FIG. 5c shows a transverse section of the region of FIG. 5a along the line A-A. The double crossed hatching 48 indicates the position of a connecting flange 34 or a stiffening rib 36, and the single hatching 50 indicates the position of a thickened region 38 of composite. The contour lines 52 indicate the extent of radial deflection in the buckled region of the annular body. As these FIGS. 5a-c indicate, the radial deflection is outward from the non-buckled shape of the annular body. The buckled region of the annular body departs from the circularity of the annular body to have a decreased radius of curvature in the transverse section, such that the annular body is radially deflected a distance 54 from the non-buckled shape of the annular body at the point of greatest radial deflection. In the axial direction, the buckled region of the annular body is also radially deflected from the un-deformed shape of the annular body. Before release from the mould, the unrelaxed residual stresses causing the outward radial deflection in the buckled region are compressive in-plane stresses. The relaxation of these stresses drives the buckling deformation. If a layered composite forms the annular body, alternate layers can be in compression or tension, but the result of the buckling is to reduce the overall stored strain energy of the residual stresses.

Figures 6A, 6B:
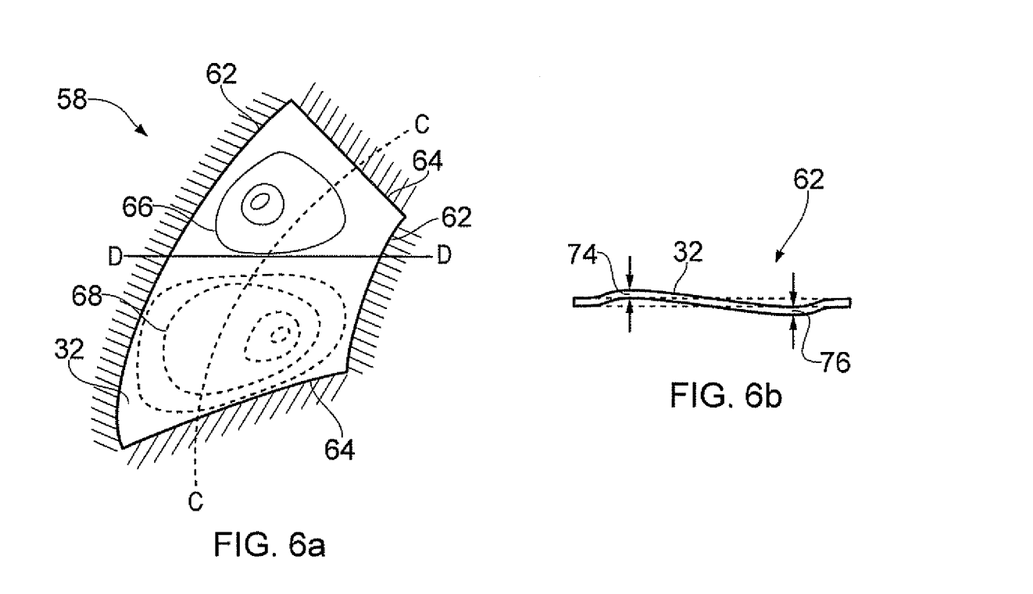
Figure 6C:
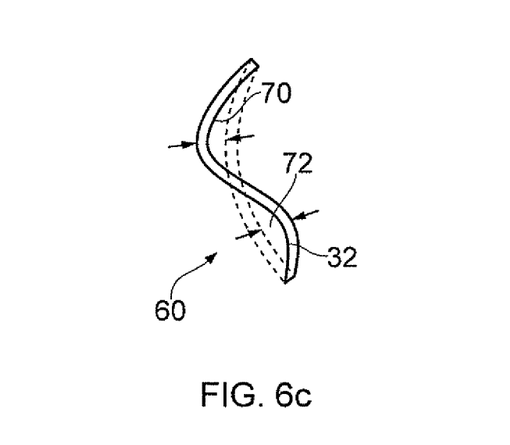

In an alternative embodiment, the radial deflection can be outward and inward, as illustrated in FIGS. 6a to 6c. FIG. 6a shows schematically a buckled region 58 of the annular body 32. The double crossed hatching 62 indicates the position of a connecting flange 34 or a stiffening rib 36, and the single hatching 64 indicates the position of a thickened region 38 of composite. The solid contour lines 66 indicate outward radial deflection and dashed contour lines 68 indicate inward radial deflection. FIG. 6b shows an axial section through the buckled region of FIG. 6a along the line D-D, and FIG. 6c shows a transverse section through the buckled region of FIG. 6a along the line C-C. Referring to FIG. 6c, the radial deflection in the buckled region is such that the buckled annular body is radially deflected outwardly along the line C-C by a distance 70 and inwardly by a distance 72 compared to the non-buckled shape of the annular body. Referring to FIG. 6b, the buckled region of the annular body deflects in the axial direction such that the buckled annular body is radially deflected along the line D-D outwardly by a distance 74 and inwardly by a distance 76 compared to the non-buckled shape of the annular body. As indicated in FIG. 6a, however, the points of greatest inward and outward deflection are spaced from C-C and D-D. Different patterns of residual stresses can lead to a preference for the buckling mode of FIGS. 6a to 6c to that of FIGS. 5a to 5c.

As illustrated in FIGS. 5a to 5c and 6a to 6c, the buckled regions 42 and 58 are bounded by the bracing elements (i.e. the stiffening ribs 36 or stiffening rib and connecting flange 34), and the thickened regions 38. The stiffness of these features is such that they undergo limited or no deflection on release from the mould. The constraint applied by the bracing elements and thickened regions encourages the deformation of the annular body in the buckled regions, as well as limiting the extent of the radial deflection in the buckled regions by limiting the size of the regions. In addition, the bracing elements and thickened regions advantageously increase the overall stiffness of the component 30. Further, the angle from the axial direction of the component of the thickened regions can locally change the dominant stiffness direction of the component.

Advantageously, the buckled regions 42 and/or 58 of the annular body 32 can increase the dimensional stability of the component 30. Additionally, the buckling-induced relaxation of the residual stresses can improve the ultimate and fatigue strength of the annular body.

In some components, rather than inducing buckling of the regions, useful deflections can be produced by non-buckling deformations, e.g. ones driven by the relaxation of compressive in-plane residual stresses on the outer side of a region and tensile in-plane residual stresses on the inner side of the region.

In a conventional, undeflected component, unintentional deflection or buckling during service can lead to detrimental reduction in the loading capability of the component. However, the present invention helps to prevent such an occurrence by intentionally pre-deflecting the component.

In a further advantage, deflected regions can respond elastically to much larger deformations than undeflected regions, even to an extent that the regions can "snap-through" to a different deflected conformation, e.g. a deflected region having an outward radial deflection can become inwardly radially deflected. Increasing the amount of elastic deformation that can be accommodated by the component can increase impact durations, thus reducing peak forces and stresses, and increasing the ability of the component to absorb impact energy through inelastic processes such as material failure, delamination and plastic deformation.

The radial deflection is not limited to the two modes described above with respect to FIGS. 5 and 6. The deflection mode can be modified by changing the position of the constraints applied by the thickened regions 38 of composite, the connecting flanges 34 and the stiffening ribs 36, by changing the thickness of the annular body in the buckled regions, or, as discussed later, by changing the temperature during curing of the composite material. The bracing elements (for example, the connecting flanges 34 and the stiffening ribs 36) and thickened regions bound the deflected regions. In a typical aeroengine component, the deflected regions may extend over areas of from 10 cm$^2$ to 400 cm$^2$. The external surface of the component itself, however, may have e.g. from 3 to 50 such regions. The deflected regions may account for more than 80%, and preferably more than 90% of the total area of the external surface of the component.

In a component, such as a fan containment casing, which must be able to withstand a serious impact, the deflected regions can help to increase the energy absorption capability of the component by encouraging composite material delamination and viscoelastic processes. For example, curvature at the boundary of a deflected region can lead to a through-thickness compression, which tends to protect the material from delamination. If the impact, however, is sufficient to cause snap-through, a sudden discontinuity in through-thickness stress can be produced which can tend to trigger delamination at this boundary site. Likewise, the high localised strains associated with snap-through can cause significant amounts of energy to be dissipated through viscoelastic processes. The deflection of the annular body 32 does not necessarily increase the annular envelope of the component 30.

For example, the deflection can allow the annular body to have a thinner wall thickness. In addition, the component (whether conventionally undeflected, or deflected according to the present invention) may include stiffening ribs and connecting flanges which in any event determine the annular envelope of the component.

The component 30 may have liner(s) covering the inner and/or outer surface, e.g. to provide a smooth gas flow surface. Indeed, conventional components often have such liners. For example, the inner surface of a conventional annular fan casing can be lined to suppress noise or resist ice impacts. However, in the context of the present invention such liners can also improve the aerodynamics of the component.

The deflected annular body deviates from exact roundness, but does conform to a round annular envelope. The geometric deviation from true roundness may be less than 1% of the diameter of the body. Typically, the radial displacement caused by the buckling at its greatest extent is between 0.1% and 10% of the diameter of the component.

Figure 7:
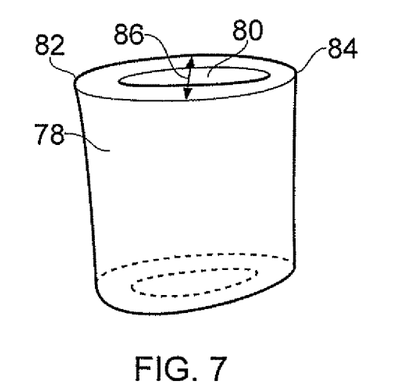
FIG. 7 shows schematically a spoke.

Another component according to the present invention has radially extending spokes connecting an annular body to a further inner or outer annular body. FIG. 7 shows a spoke 78 having a smooth surface and tapering at a leading edge 82 and a trailing edge 84 with respect to gas flow over the spoke, creating a thicker central section 86. This can have the function of gas flow straightening, i.e. the spoke can be an aerofoil. The spoke may have a hollow centre 80 to facilitate, for example, cooling air flow, oil supply, electrical supply or cabling for sensors.

Figure 9:
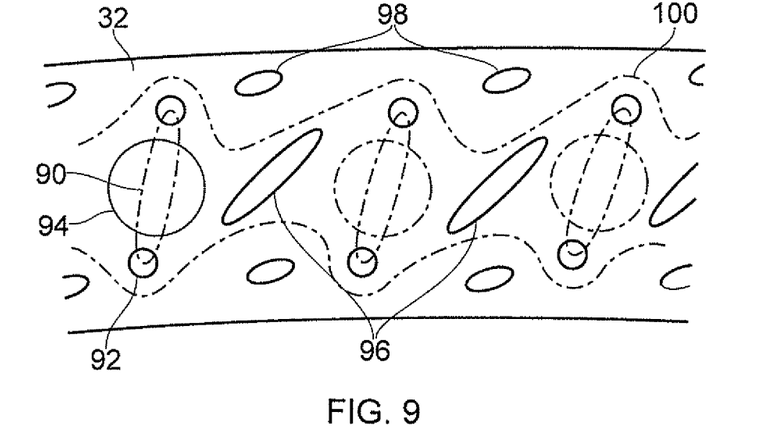
FIG. 9 shows schematically buckling and deformation of the outer surface an annular body having radially inward extending spokes of the type shown in FIG. 7.

FIG. 9 shows the radial deflection of the outer surface of an annular body 32 with radially inward extending spokes 78, the solid contours 92, 96, 98 indicating outward radial deflection and broken line contours 94, 100 indicating inward radial deflection caused by buckling. The dashed line 90 illustrates the positions of the feet of the spokes that are extending from the inner surface of the annular body, i.e. the opposite surface to that shown in FIG. 9. The spokes are integrated into the annular body during curing, e.g. by hybrid connection. Advantageously, the spokes constrain and limit the buckled regions of the annular body, which can eliminate or reduce the need for stiffening ribs and/or thickened regions. The greatest magnitude of outward radial deflection is indicated by the oval contours 96. The off-axis direction of the long axes of the oval contours is caused by the positions of the spokes, which in this example themselves have chordal directions which are angled from the axial direction of the component. In alternative embodiments, the spokes can have chordal directions which are axially aligned, and in these embodiments to direct the buckling and enforce a particular alignment on the direction of the long axes of the oval contours it may be necessary to control the thickness of the annular body in specific locations.

Figure 8:
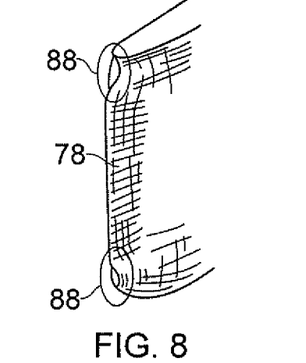
FIG. 8 shows schematically buckling that can occur at a leading and trailing edge of the spoke of FIG. 7.

Integrating the spokes into the annular body during curing can allow the composite material of the annular body to deform around the spokes, due to thermal and/or chemical shrinkage during curing. The deformation around the spokes is indicated by the contours 92 at the leading and trailing edges of the spokes and the contours 94 centred on the spokes. This deformation is not buckling, so the annular body can display linear-elastic properties in these regions. However, advantageously, the deformation of the annular body around the spokes can prevent local buckling at the leading and trailing edges of the spokes of the type illustrated in FIG. 8, such local buckling being aerodynamically undesirable.

The aforementioned components (both spoked and unspoked) can be manufactured by positioning constituents of a composite material in a mould, along with the connecting flanges 34, stiffening ribs 36, and/or spokes 78. The hollow, axisymmetric, annular body 32 can be moulded as a single piece. Alternatively, however, a mould may produce just a portion of the body, different such portions being subsequently connected to form the complete body. The composite material is cured in the mould. During the curing process the temperature of the constituents in the mould is controlled so as to generate residual stresses in the resulting composite material. This process of designing in residual stresses results in an annular body that can spontaneously buckle when removed from the mould Generally, the reinforcing fibres of a composite material are stiffer than the resin matrix. The cure of the resin is an exothermic chemical reaction which typically does not conserve volume, and which is usually responsible for the majority of the shrinkage of the composite material. The direction of the shrinkage tends to be perpendicular to the direction of the fibres because the stiffness of the fibres provides a constraint, and for relatively thin regions also tends to be in the direction of the thinnest dimension.

Curing causes the polymer material of the resin to chemically cross-link. In so doing, the polymer material becomes rigid and "locks" the reinforcing fibres of the composite in place. Curing tends to occur first where temperatures are highest, and thus the exothermic nature of curing generally serves to accelerate the cure in the immediately surrounding material. Therefore controlling the curing temperature can control the residual stresses that cause buckling. For example, composite constituents in a hot mould will cure and form to shape at the outer surfaces of the composite material before the composite material inner, and because curing makes the outer surfaces rigid the composite material inner is more constrained.

One method of generating residual stresses is to apply thermal gradients across the composite constituents during curing. The thermal gradients can be controlled such that the constituents of the composite material are heated in a manner that will generate residual stresses to cause buckling in the desired regions and of the desired radial deflection, so as to achieve a dimensionally stable annular body 32. Thermal gradients can be achieved by arranging insulation layers, heat sinks and sources, and heat control mechanisms on the surface of the mould.

An alternative method of generating residual stresses is to cure the composite material from the composite material inner to the outer surfaces of the composite material. This can be achieved using heating elements or focused microwave heating. For example, to heat the composite material using a heating element, an electrical heating element(s) can be positioned within the composite material before curing. During curing, the electrical heater can be used to control the temperature of the composite material, and once the composite material is cured, the electric heater becomes positioned within the annular body 32.

To heat the composite material using focused microwave heating, the microwaves can be tuned to the constituents or the composite material, for example the fibres and resin. Additionally, to further enhance the control of the temperature throughout the composite material during curing, the composite material can include additives strategically placed in the composite material and to which the microwaves are tuned.

To further enhance the generation of residual stresses the constituents of the composite material can be locally cooled during curing.

It will be apparent that the heat flow through the composite constituents during curing is also dependent upon the properties of the reinforcing fibres. For example, carbon fibres are relatively good heat conductors compared to glass fibres.

It will also be apparent that the curing conditions and positions of the stiffening ribs and thickened regions can be found using modelling approaches, which may include stress analyses, thermal analyses, chemical analyses and/or fluid dynamics simulations. However, one option for forming the buckled region 58 of FIG. 6a is to hold the initial mould temperature of the part of the region above line D-D higher than the initial mould temperature of the part of the region below line D-D. There will then be a differential shrinkage across the line DD which can start a buckle, caused by the material in the upper part of the region curing quicker than the material in the lower part of the region While the invention has been described in conjunction with the exemplary embodiments described above, many equivalent modifications and variations will be apparent to those skilled in the art when given this disclosure. For example, although the hollow axisymmetric body is described above in the context of an annular gas turbine component, other components having hollow axisymmetric bodies may also benefit from having buckled regions. For example, sports headwear (e.g. riding hats, cricket helmets), body armour, and reinforcing stents for artery repair are possible applications. Accordingly, the exemplary embodiments of the invention set forth above are considered to be illustrative and not limiting. Various changes to the described embodiments may be made without departing from the spirit and scope of the invention.

The invention claimed is:

1. A method of manufacturing a hollow composite article comprising an annular axisymmetric body, the method comprising:
    positioning composite material constituents of the hollow composite article into a mold corresponding to a shape of the hollow composite article;
    curing the constituents into an annular composite part;
    generating residual stresses during the curing by applying one or more localized thermal gradients across the composite part, positioning one or more bracing elements locally constraining the composite part, or providing one or more localized thickened composite material regions constraining the composite part; and
    relaxing the generated residual stresses to form circumferentially spaced radially deflected body regions having a non-linear elastic load bearing response, a greatest radial deflection of each deflected region being at least 0.1% of a greatest diameter of the hollow composite article, and each deflected region causing a corresponding transverse cross-section through the annular axisymmetric body to locally depart from true circularity by the amount of radial deflection.

2. The method according to claim 1, wherein the greatest radial deflection of each deflected region is at most 10% of the hollow composite article diameter at each deflected region.

3. The method according to claim 1, wherein the radial deflection of each deflected region is intentionally generated.

4. The method according to claim 1, wherein the one or more thermal gradients are applied across the composite material during the curing so as to generate the residual stresses.

5. The method according to claim 1, wherein the bracing elements are positioned in the mold before the curing step, the bracing elements being integrated into the composite part during the curing and constraining the composite part so as to promote generation of the residual stresses.

6. The method according to claim 1, wherein the mold is shaped to provide the one or more thickened regions of composite material, the thickened regions constraining the composite material in adjacent thin regions so as to promote generation of the residual stresses in the thin regions.

7. The method according to claim 1, wherein radial deflection of each deflected region is between 0.25% and 4% of the diameter of the hollow composite article at each deflected region.

8. The method according to claim 1, wherein the hollow composite article deviates from true roundness by less than 1% of the diameter of the hollow composite article.

9. The method according to claim 8, wherein the deflected regions are circumferentially spaced so as to produce a degree of polygonisation on a transverse cross-section through the hollow composite article.

10. The method according to claim 8, wherein the deflected regions are equally circumferentially spaced so as to help retain general roundness of the hollow composite article.

11. The method according to claim 1, wherein the deflected regions account for more than 80% of a total external surface area of the hollow composite article.

12. The method according to claim 1, wherein the thermal gradients are applied by insulating layers, heat sinks, an electrical heater, a microwave heater, or local cooling.

13. A method according to claim 1, wherein the radial deflection of each deflected region is a buckling deflection.

14. A method according to claim 1, wherein the radial deflection of each deflected region is between 0.5% and 2% of the article diameter at each deflected region.

15. A method according to claim 1, wherein the deflected regions account for more than 90% of the total external surface area of the article.

16. A method according to claim 1, wherein loading in a direction increasing amplitude of the deflected regions gives rise to a non-linear elastic response, while loading in other directions gives rise to a stiffened but linear elastic response.

17. A method according to claim 1, wherein the deflected regions can snap through to a different deflected conformation.

18. A method according to claim 1, wherein the bracing elements are positioned in the mould with pre-cured composite material, whereby anchoring parts of the bracing elements are permanently embedded into the cured composite part.

19. A method according to claim 1, wherein the article is a component of a gas turbine engine.

* * * * *